Oct. 2, 1928.

L. McCLOSKEY 1,686,023

PIPE VISE AND STAND

Filed March 19, 1924

Inventor
Leo McCloskey,
By
Attorneys

Oct. 2, 1928.
L. McCLOSKEY
1,686,023
PIPE VISE AND STAND
Filed March 19, 1924　　2 Sheets-Sheet 2
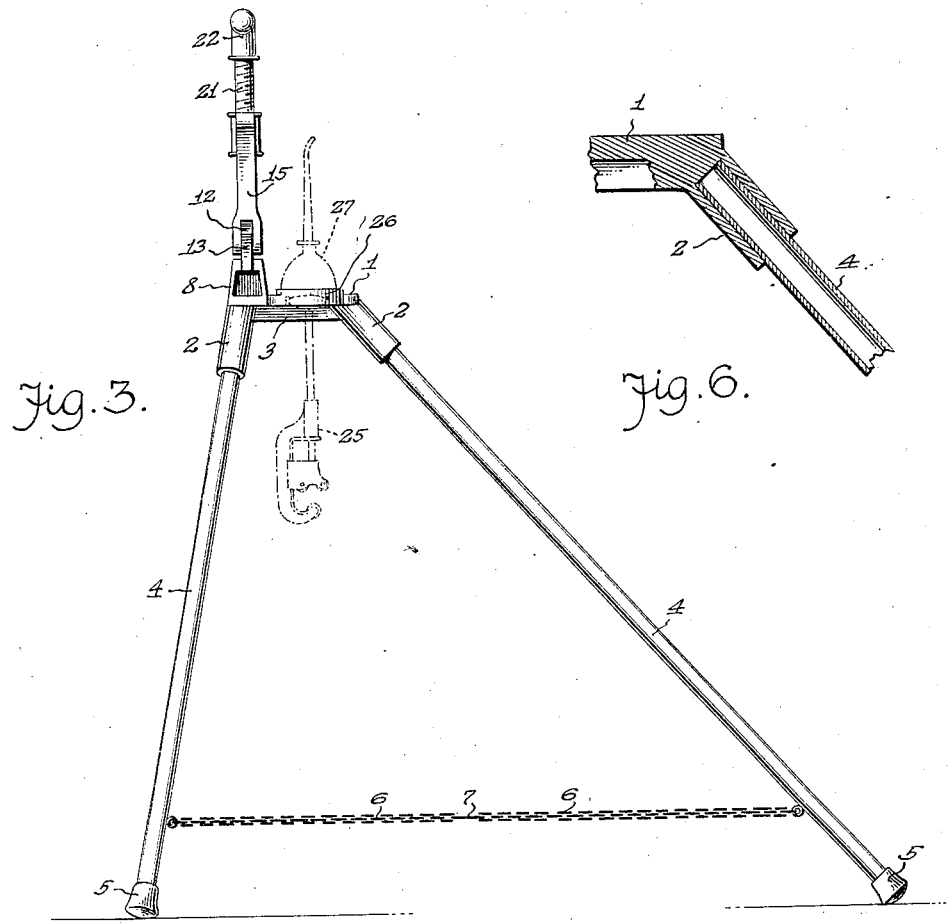
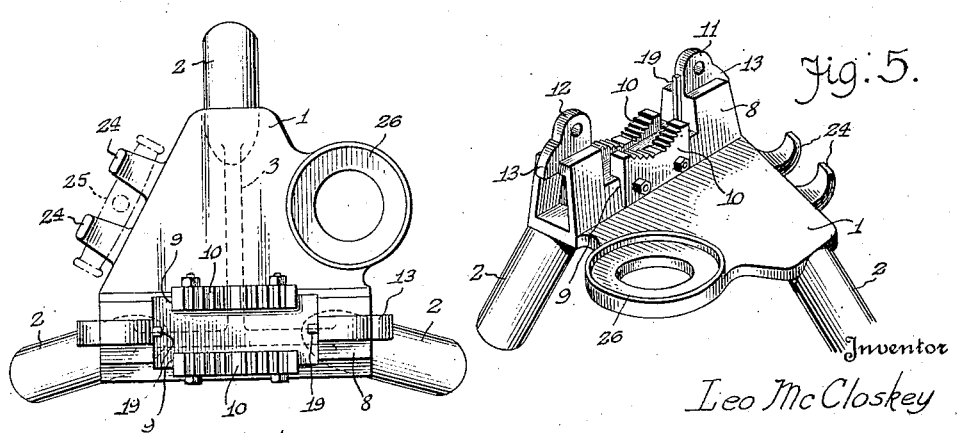

Patented Oct. 2, 1928.

1,686,023

UNITED STATES PATENT OFFICE.

LEO McCLOSKEY, OF ESSEX, ONTARIO, CANADA.

PIPE VISE AND STAND.

Application filed March 19, 1924, Serial No. 700,406, and in Canada November 22, 1923.

This invention relates to a combined pipe vise and stand and the primary object of my invention is to provide a tripod stand for safely supporting a pipe vise so that the vise can be conveniently used and readily carried from one location to another, without the necessity of providing a bench or other support each and every time the vise is to be used.

Another object of my invention is to provide a collapsible vise stand that may be also used for supporting an oil can, wrenches and other tools used by plumbers and pipe fitters.

A further object of this invention is to provide a simple, durable and inexpensive vise stand on which a vise may be manipulated in the usual and well known manner.

The above and other objects are attained by a mechanical construction that will be hereinafter described and then claimed and reference will now be had to the drawings, wherein Figure 1 is a front elevation of the stand provided with a pipe vise;

Fig. 3 is a side elevation of the pipe vise stand;

Fig. 4 is a plan of the table portion of the stand;

Fig. 5 is a perspective view of the same, and

Fig. 6 is an enlarged detail sectional view showing a leg socket.

Figure 1:
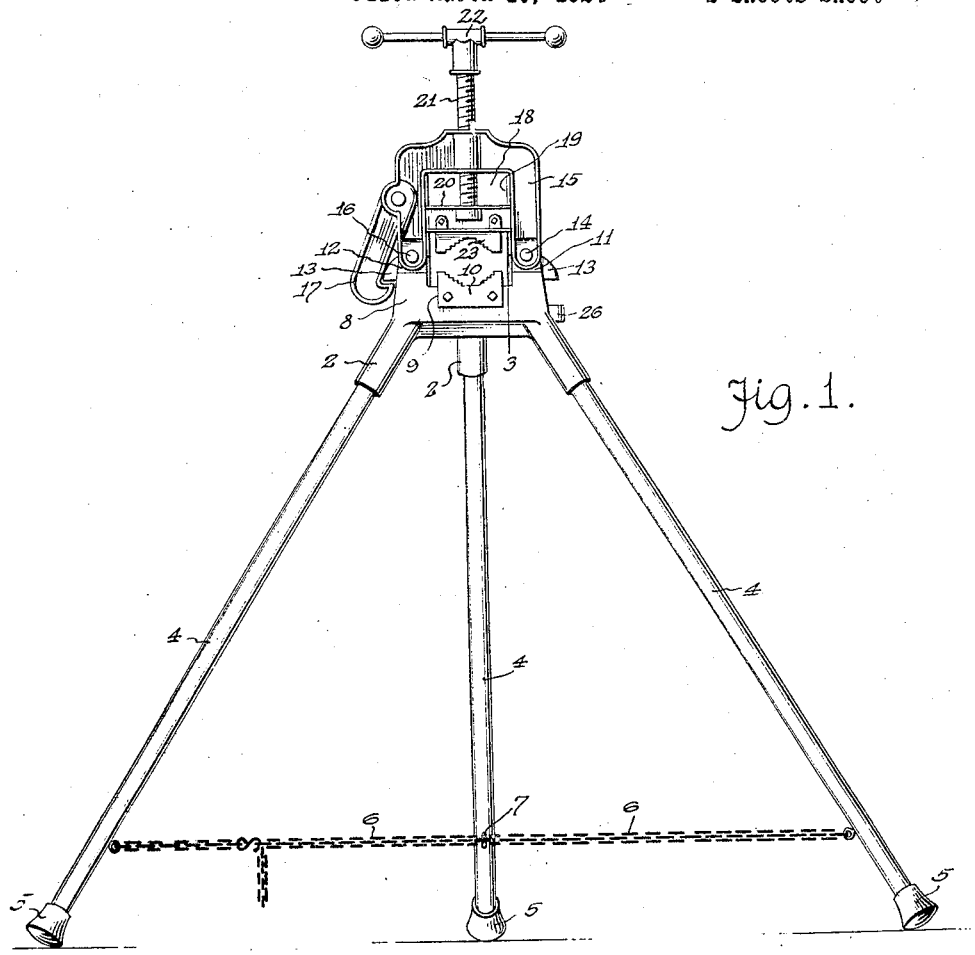
Figure 2:
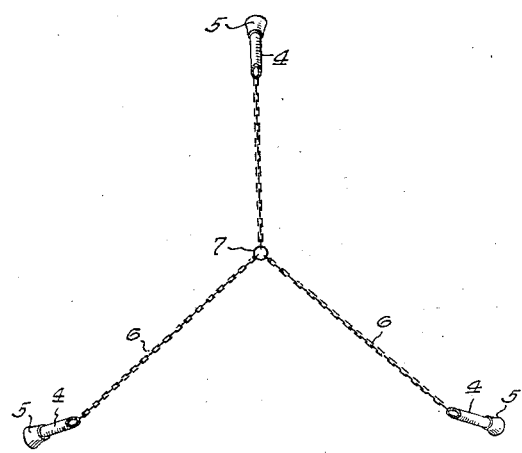
Fig. 2 is a horizontal sectional view of the stand on a smaller scale, showing a flexible leg connecting member.

In the drawings, the reference numeral 1 denotes a table or platform substantially triangular in plan and diverging from the lower face of said table are leg sockets 2 connected by ribs or webs 3. Detachably mounted in the sockets 2 are the upper ends of diverging tubular legs 4 which are adapted to form a tripod for safely supporting the table 1 in a horizontal position. Two of the legs project forwardly from the table 1, and the other or rear leg projects rearwardly from the table 1, at a greater angle relative to the table 1 than the forwardly extending legs, said legs being approximately one hundred and twenty degrees apart. On the lower ends of the legs 4 are socket feet 5 that may be made of any suitable material, for instance, vulcanized rubber, to prevent a floor or other surface from being injured by the stand.

Connecting the legs 4 adjacent their lower ends is a connecting member composed of a flexible member or members such as cables 6 in the form of wire cables or chains which may be attached to the legs 4, or disconnected therefrom by means of hooks engaging eyes on the legs with the cables converging to a central link or ring 7 which connects all of said cables, so that when the stand is in knock-down condition with the legs removed from their sockets, these cables may be housed within the hollow legs for convenience in transportation.

On the front edge of the table 1 is a substantially U-shaped base 8 having recesses 9 to receive detachable pipe gripping members 10 which are normally stationary but may be exchanged for other pipe gripping members, dies or machine elements that may be used in the vise. The base has apertured ears 11 and 12 provided with laterally projecting keepers 13.

Pivotally connected to the apertured lug 11 by a pin 14 or other pivotal means is an inverted U-shaped vise member or gate 15 that may be held in a closed position by a detachable pin 16 extending through the vise member and the apertured lug 12, the pin being used when pieces of work can be conveniently handled in the vise without opening the vise member or gate. If the vise member or gate is to be temporarily closed a pivoted hook 17, on the side of the vise member, is used, said hook engaging under one of the keepers 13 of the vise base 8. It is in this connection that the vise member 15 can be reversed and pivotally connected to the apertured lug 12 and the pin 16 used in connection with the apertured lug 11, while the hook 17 will engage the other keeper 13.

The base 8 and the vise member 15 cooperate in providing a window or opening 18 having its side walls formed with guides 19 for a slide head 20. Rotatably connected to the slide head is a screw 21 which is in screwthreaded engagement with the vise member or gate 15 and is provided with a suitable handle 22 adapted to be rotated to raise or lower the slide head 20.

Attached to the slide head 20 in any suitable manner, is one or more pipe gripping members 23 adapted to confront the pipe gripping members 10 and cooperate therewith in gripping a pipe or other structure to be held by the vise.

On one side of the table 1 are stationary hooks 24 and on and between these hooks may be suspended a pipe cutter 25 or other tool, as shown in Fig. 3. On the opposite side of the table 1 is an apertured flange seat or cup 26 in which may be placed an oil can 27 or other receptacle.

With the vise at the front edge of the table 1 there is sufficient clearance for the manipulation of a pipe wrench, threading dies or other tools on a pipe or other structure clamped in the vise, and the table affords ample suppport for other tools or parts to be attached to pipes.

By removing the legs 4 the table will occupy a comparatively small space when not in use and can also be conveniently carried with or without the vise.

One embodiment of my invention has been illustrated, but it is to be understood that the structural elements are susceptible to such changes as fall within the scope of the appended claim.

What I claim is:—

A vise and stand comprising a table having a front edge thereof provided with integral end diverging leg sockets and its rear edge with a leg socket of greater angularity than the first mentioned leg sockets, legs in all of said sockets, an integral base on the front edge of said table, integral apertured ears on said base above the sockets at the front edge of said table and affording laterally projecting keepers, gripping members fastened to said base intermediate the ends thereof, a reversible vise member pivotally connected to one of said apertured ears, and engageable with the other ear, a hook carried by said vise member and engageable with the keeper opposite the pivotal connection of said vise member, and an adjustable gripping member in said vise member opposing said gripping members.

In testimony whereof I affix my signature.

LEO McCLOSKEY.